US007053910B2

(12) United States Patent
Newman

(10) Patent No.: US 7,053,910 B2
(45) Date of Patent: May 30, 2006

(54) REDUCING METAMERISM IN COLOR MANAGEMENT SYSTEMS

(75) Inventor: Todd D. Newman, Palo Alto, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 09/916,436

(22) Filed: Jul. 30, 2001

(65) Prior Publication Data

US 2003/0020727 A1  Jan. 30, 2003

(51) Int. Cl.
G09G 5/02 (2006.01)
(52) U.S. Cl. ................................ 345/604; 382/167
(58) Field of Classification Search ........ 345/589–605; 382/167, 162; 358/523, 515, 518, 519, 520, 358/521, 522, 1.9
See application file for complete search history.

(56) References Cited

U.S. PATENT DOCUMENTS

| | | | | |
|---|---|---|---|---|
| 4,839,722 | A * | 6/1989 | Barry et al. | 358/523 |
| 5,446,476 | A * | 8/1995 | Kouzaki | 347/232 |
| 5,463,480 | A * | 10/1995 | MacDonald et al. | 358/520 |
| 5,710,876 | A * | 1/1998 | Peercy et al. | 345/426 |
| 5,907,495 | A * | 5/1999 | Snyder et al. | 703/6 |
| 6,023,527 | A * | 2/2000 | Narahara | 382/167 |
| 6,088,038 | A | 7/2000 | Edge et al. | 345/431 |
| 6,459,496 | B1 * | 10/2002 | Kumada et al. | 345/590 |
| 6,480,299 | B1 * | 11/2002 | Drakopoulos et al. | 358/1.9 |
| 6,542,634 | B1 * | 4/2003 | Ohga | 382/167 |
| 6,664,973 | B1 * | 12/2003 | Iwamoto et al. | 345/589 |
| 6,668,079 | B1 * | 12/2003 | Takemoto | 382/167 |

FOREIGN PATENT DOCUMENTS

JP    11-275376    10/1999

OTHER PUBLICATIONS

International Color Consortium (ICC), "File Format For Color Profiles", ICC Specification No. ICC.1:Sep. 1998, as amended by "Addendum 2", Document No. ICC.1A:Apr. 1999.

(Continued)

*Primary Examiner*—Matthew Luu
(74) *Attorney, Agent, or Firm*—Fitzpatrick, Cella, Harper & Scinto

(57) ABSTRACT

A metamerism-reducing color transformation in which a color value in a perceptual color space is mapped to a corresponding color value in a device dependent color space. Multiple different inverse transforms are applied to the color value in the perceptual color space, one each for respective ones of multiple different viewing conditions such as different viewing illuminants or different surround, thereby resulting in plural different target color values in a viewing condition dependent space. The plural different target color values in the viewing condition dependent space are subjected to regression analysis based on a spectral model of reflectance of device colors so as to calculate to a single color coordinate in device dependent coordinates that best fits the plural different target color values in the viewing condition dependent space. The regression analysis may be a weighted regression analysis. Because the color value in the destination device dependent color space is obtained through best-fit regression analysis of plural different target color values corresponding to multiple different viewing conditions, metameric shifts in the color's appearance due to changes in viewing condition are significantly reduced as compared to transformations which obtain values accurate only for a single viewing condition.

24 Claims, 18 Drawing Sheets

OTHER PUBLICATIONS

S.N. Pattanaik, et al., "A Multiscale Model of Adaptation and Spatial Vision for Realistic Image Display", Program of Computer Graphics, Cornell University.

Henri Maitre, et al., "Spectrophotometric Image Analysis of Fine Art Paintings", The Fourth Color Imaging Conference: Color Science, Systems and Applications, 1996, IS&T.

Di-Yuan Tzeng and Roy S. Berns, "Spectral-Based Ink Seletion for Multiple-ink Printing II. Optimal Ink Selection", Munsell Color Science Laboratory, RIT Chester F. Carlson Center for Imaging Science, Copyright 1999, IS&T.

Seth Ansell, "Measurement of Fluorescence In Inkjet and Laser Printing", Canon Research and Development Center Americas, Inc. San Jose, CA USA.

* cited by examiner

FIG.5

BI-SPECTRAL RADIANCE FACTOR MATRIX
WAVELENGTH OF EXCITATION (λ), WAVELENGTH OF EMISSION (σ)

| | λ=300 | λ=310 | λ=320 | ... | λ=760 | λ=770 | λ=780 |
|---|---|---|---|---|---|---|---|
| σ=300 | (λ,σ) | | | | | | |
| σ=310 | (λ,σ) | (λ,σ) | | | | | |
| σ=320 | (λ,σ) | (λ,σ) | (λ,σ) | | | | |
| ... | (λ,σ) | (λ,σ) | (λ,σ) | (λ,σ) | | | |
| σ=760 | (λ,σ) | (λ,σ) | (λ,σ) | (λ,σ) | (λ,σ) | | |
| σ=770 | (λ,σ) | (λ,σ) | (λ,σ) | (λ,σ) | (λ,σ) | (λ,σ) | |
| σ=780 | (λ,σ) | (λ,σ) | (λ,σ) | (λ,σ) | (λ,σ) | (λ,σ) | (λ,σ) |

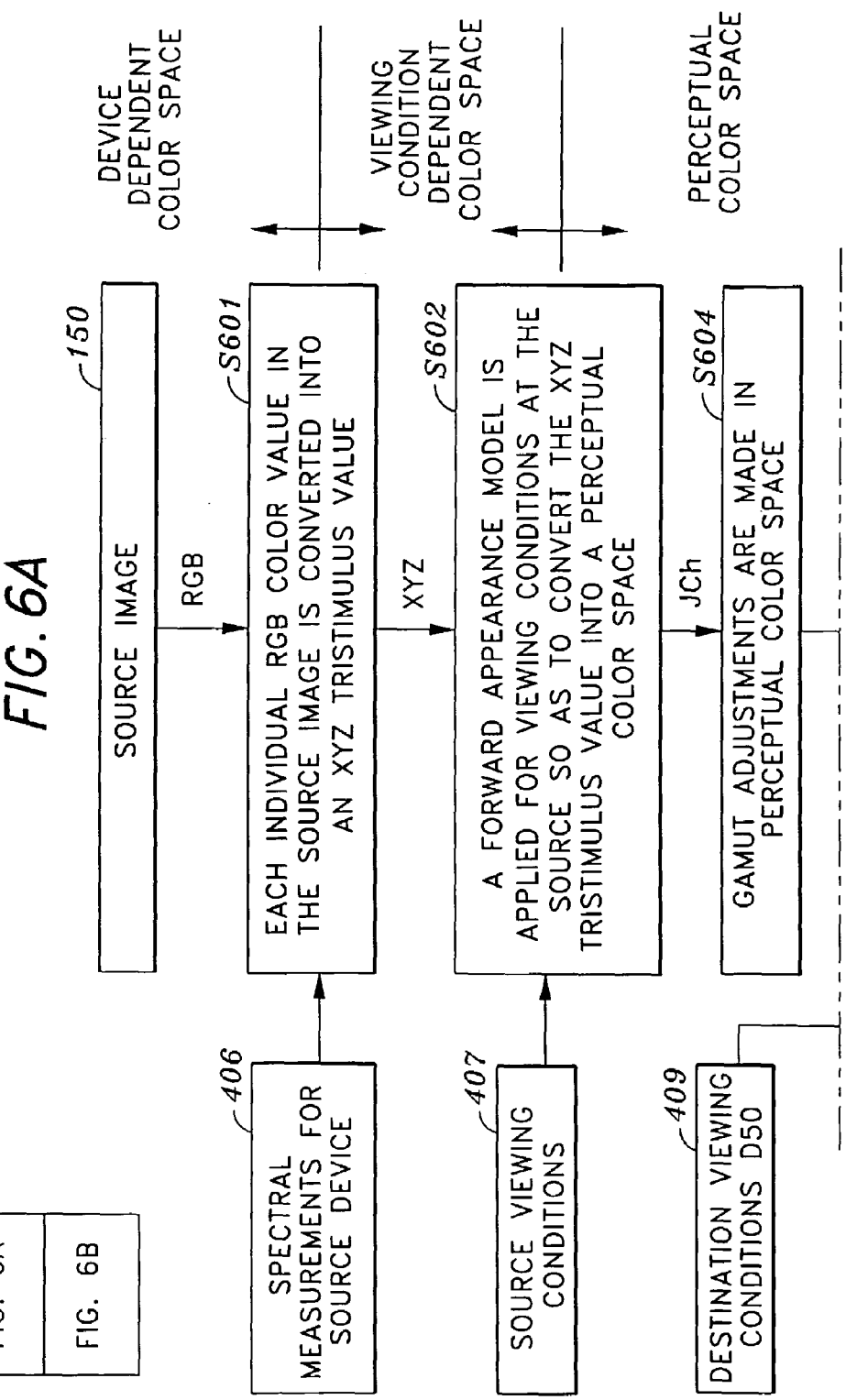

FIG. 14
(PRIOR ART)

| FIG. 14A |
|----------|
| FIG. 14B |

FIG. 14A

DEVICE DEPENDENT COLOR SPACE ↕ VIEWING CONDITION DEPENDENT COLOR SPACE ↕ PERCEPTUAL COLOR SPACE

SOURCE IMAGE (150)
↓ RGB
EACH INDIVIDUAL RGB COLOR VALUE IN THE SOURCE IMAGE IS CONVERTED INTO AN XYZ TRISTIMULUS VALUE (S1401)
↑ SPECTRAL MEASUREMENTS FOR SOURCE DEVICE
↓ XYZ
A FORWARD APPEARANCE MODEL IS APPLIED FOR VIEWING CONDITIONS AT THE SOURCE SO AS TO CONVERT THE XYZ TRISTIMULUS VALUE INTO A PERCEPTUAL COLOR SPACE (S1402)
↑ SOURCE VIEWING CONDITIONS
↓ JCh
GAMUT ADJUSTMENTS ARE MADE IN PERCEPTUAL COLOR SPACE (S1404)

REDUCING METAMERISM IN COLOR MANAGEMENT SYSTEMS

BACKGROUND OF THE INVENTION

1. Field of the Invention

The present invention relates to color management systems in which metamerism is reduced when a destination image (typically, a color printout) is viewed under different viewing conditions (such as different illuminants or different surrounds).

2. Description of the Related Art

"Metamerism" describes the physiological response of the human visual system by which exactly the same color appearance can result from different color stimuli. It is because of metamerism that modern four-color separation processing can reproduce such a broad range of colors.

There are some objects that appear the same to the human eye, and yet the energy spectra reflecting back from these objects are very different. Without metamerism, printing a picture containing each of these objects would require special inks for each object. The number of inks required would be unmanageable. Because of metamerism, almost the same stimuli for the eye can be produced using only a few different inks, usually cyan, magenta, yellow and black.

Again because of metamerism, it is often possible to produce the same color appearance with different combinations of CMYK colors. For example, a color formed with 100% cyan, 100% yellow, 30% magenta and no black would look the same as a color formed with 70% cyan, 70% yellow, 30% black, and no magenta. This feature of metamerism is exploited in the invention described later.

Metamerism is fundamentally affected by the viewing conditions such as the illuminant and the surround, but particularly the illuminant. As an extreme example, consider a four-color printout of a green leaf side-by-side with an actual leaf. In natural light, both appear green. However, when viewed under a yellow light, while the leaf will still appear green, the four-color print will appear black or dark blue.

Conventional color management systems ignore the effects of a changed illuminant (or other changes in the viewing conditions) on the destination image. The flow of a typical color management system is illustrated in FIG. 14. Apart from gamut mapping and other changes, FIG. 14 is somewhat similar to the process described in U.S. Pat. No. 5,463,480. The process operates on each individual color in a source image 150 so as to produce a corresponding CMYK color value for a destination image 160 in which the appearance of the colors in the destination image accurately matches the appearance of the colors in the source image. Thus, in step S1401, each individual RGB color value in the source image is converted into an XYZ tristimulus value, and a forward appearance model is applied in step S1402 for viewing conditions at the source so as to convert the XYZ tristimulus values into a JCh value in JCh color space (or other perceptual color space). In step S1404, gamut adjustments are made in the perceptual color space, and the resulting JCh color value is inverse-transformed in step S1405, using the destination device viewing conditions, into a single XYZ tristimulus value in viewing condition dependent color space. The XYZ tristimulus value is then converted to a color value in output device coordinates (such as CMYK), for printout by the output device (step S1407).

The resulting CMYK color, when viewed under the viewing conditions used in the inverse transform, will appear as an accurate match to the original color in the source image. As noted above, the resulting color will exhibit metameric shifts if viewed under viewing conditions that differ from that applied at step S1405 in the inverse-transform.

SUMMARY OF THE INVENTION

It is an object of the invention to reduce the effects of metamerism even when a destination image is viewed under multiple different viewing conditions such as different illuminants.

According to the invention, multiple different inverse appearance transforms are applied to a color value in perceptual color space (such as Lab or JCh space), one each for multiple different viewing conditions (such as different viewing illuminants), thereby resulting in plural different target color values in a viewing condition dependent space (such as XYZ space), one each in correspondence to the multiple different viewing conditions. A single, "best fit", color value in device coordinates is then obtained for the plural different target color values in viewing condition dependent space. Here, "best fit" means that although the obtained color value is not an exact match for all the plural different target color values in viewing condition dependent space, the errors from an exact match are controlled or meet acceptable error conditions, such as a least-square fit.

To obtain the single color value in device coordinates that best fits the plural different target color values in viewing condition dependent space, the device's color behavior is modeled using a spectral model. The spectral model measures spectral reflectance of colors in device space as a function of wavelength. Regression analysis such as a least squares fit is then preformed, using the spectral model, the multiple different viewing conditions, and the plural different target color values in viewing condition dependent space, so as to obtain a single best fit color value in device coordinates.

In the particular situation of XYZ tristimulus values (viewing condition dependent) and CMYK color values (device dependent), because metamerism implies that many different CMYK combinations will produce any one color appearance, the probability of a good fit for plural different target XYZ tristimulus values is high. The CMYK color value obtained by such regression is then used to reproduce the corresponding color from the source image.

Because the destination device color is obtained through a best-fit regression analysis of plural different target color values corresponding to multiple different viewing conditions, metameric shifts in the color's appearance due to changes in viewing condition are significantly reduced as compared to color management systems which obtain colors accurate only for a single viewing condition.

To assist in determining which fit is "best", the importance of different ones of the viewing conditions can be weighted so as to represent more accurately the probability that any one viewing condition occurs. For example, in a situation where empirical analysis or other means has indicated that a particular image such as a photographic image is more likely to be viewed in a home environment under incandescent illumination rather than an office environment under fluorescent illumination, and not likely at all to be viewed in natural light, weights can be applied which favor incandescent illumination over fluorescent illumination, with near-zero weighting given to natural illumination. To assist in proper selection of such weights, and according to a further aspect of the invention, a graphical user interface is provided by which suitable weights are input or selected for selectable viewing conditions.

According to further aspects of the invention, the results of regression analysis for multiple different viewing conditions are incorporated into a color profile, such as by building a color look-up table for a standardized device profile. A suitable standard format for such a device profile is defined by the International Color Consortium (ICC) at "File Format For Color Profiles", ICC Specification No. ICC.1:1998-09 (1998), as amended by "Addendum 2", Document No. ICC.1A:1999-04 (1999). According to this aspect of the invention, a device profile includes instructions for converting color values from a perceptual color space (such as Lab or JCh space) into color values in a device dependent color space (such as CMYK), in which such conversions implement regression analysis of plural different target color values corresponding to multiple different viewing conditions. In a preferred implementation, a color look-up table (CLUT) implements such a color conversion and contains the instructions for converting from the perceptual color space to the device dependent space (such as CMYK space).

In further aspects, the invention is a color management system which, when making a conversion from a perceptual color space (such as Lab or JCh) into a viewing condition dependent space (such as XYZ tristimulus values), makes plural such conversions using multiple different viewing conditions (such as illuminant or surround), and which then applies regression analysis to the plural results so as to obtain a single best fit value in device coordinates (such as CMYK printer coordinates) that best fits the plural results.

In a preferred implementation of this aspect of the invention, a user interface is provided so as to permit user selection of viewing conditions in which the image is expected to be viewed. Based on user selection, weights are assigned to each different viewing condition in the regression analysis, so as to specify the meaning of "best" when a best fit is performed.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 5, reproduced from Seth Ansell's paper, *Measurement of Fluorescence in Inkjet and Laser Printing*, demonstrates how incident energy at one wavelength may be reflected/emitted by flourescent materials at longer wavelengths.

FIGS. 6A and 6B are flow diagrams depicting computer executable process steps for reducing metamerism in color management systems according to the embodiment of the present invention.

FIGS. 14A and 14B are flow diagrams depicting a conventional color management system.

DETAILED DESCRIPTION OF THE PREFERRED EMBODIMENTS

In one aspect, the present invention is applied to populate color look-up tables (CLUT's) that are used by a color management module in a computer. Color management modules are generally utilized in computing devices, such as personal computers, to adjust color data during printing operations. The color management module generally accesses color look-up tables stored in the computer in order to perform operations such as color translation and gamut mapping. In further aspects, although the invention is applied during the development phase of the color appearance models, the resulting models are later used by an end user during actual color management sessions.

The present invention is generally directed to a color management system for managing color data representing an image from a first color space corresponding to one device, into a second color space corresponding to another device. Specifically, the color management system of the present invention reduces metamerism when a destination image is viewed under multiple different viewing conditions, such as illuminants or surround. Multiple different inverse appearance transforms are applied to a color value in perceptual color space, one each for different viewing conditions, thereby resulting in plural different target color values in a viewing condition dependent space, one each in correspondence to the different viewing conditions. Regression analysis is applied to obtain a single best fit color value in output device coordinates for the plural different target color values in viewing condition dependent space, modeling the device's color behavior using a spectral model.

The color management system according to the present invention may be incorporated in an output device driver for execution in a computing device, such as a printer driver, embedded in the firmware of an output device, such as a printer, or provided in a stand-alone color management application for use on a general purpose computer. It can be appreciated that the present invention is not limited to these embodiments and that the present invention may be used in other environments in which reduction in color metamerism is desired.

Figure 1:
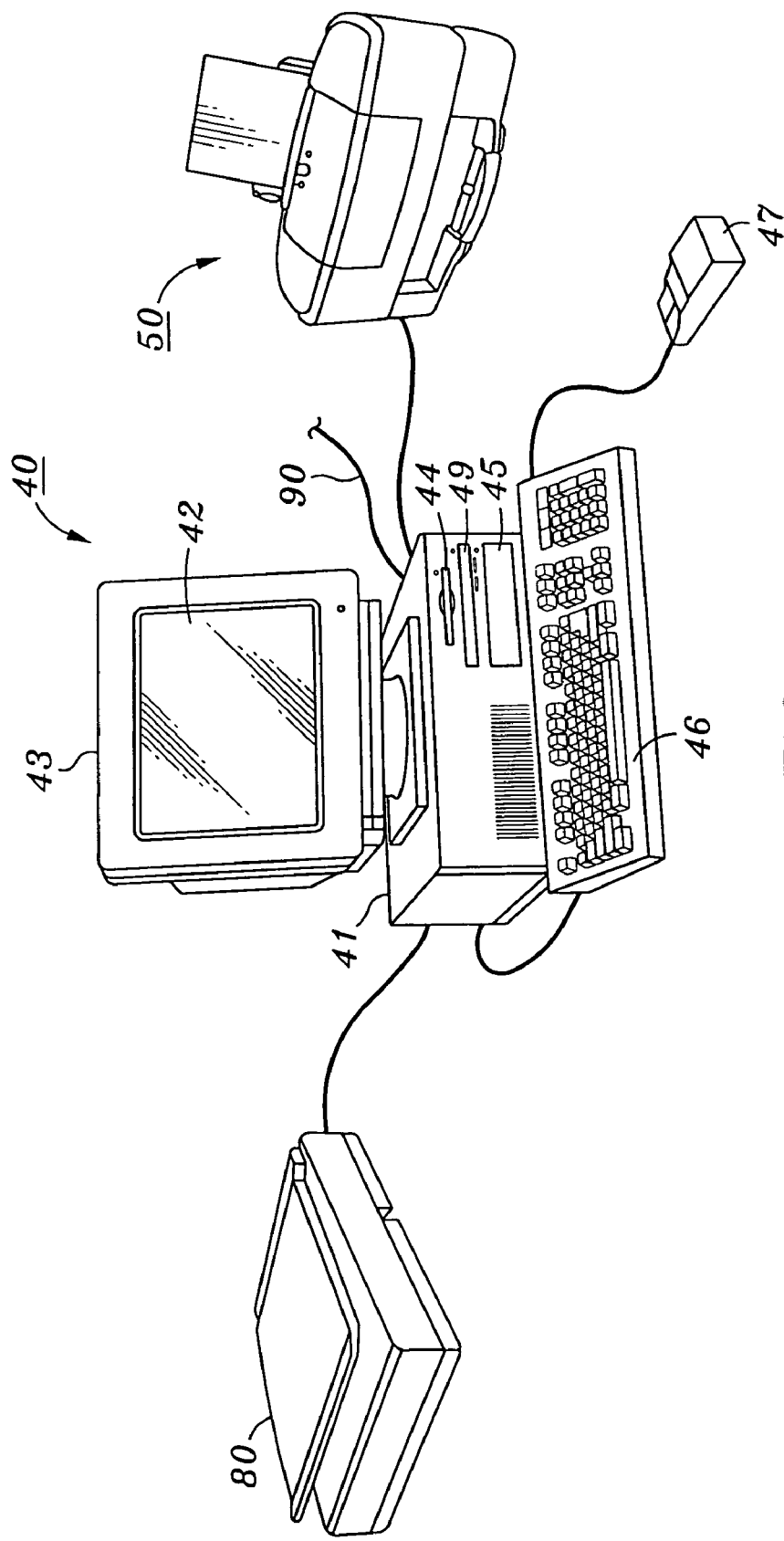
FIG. 1 is a representative view of a computer system in which the present invention may be implemented.

FIG. 1 is a view showing the outward appearance of a representative computing system used to populate a color lookup table according to the invention, including computing equipment, peripherals and digital devices which may be used in connection with the practice of the present invention. Computing equipment 40 includes host processor 41 which comprises a personal computer (hereinafter "PC"), preferably an IBM PC-compatible computer having a windowing environment such as Microsoft Windows 95, Windows 98, Windows NT, Windows 2000, Windows ME or Windows XP, although it may be a Macintosh, non-windows based or other computer. Provided with computing equipment 40 are color monitor 43 including display screen 42, keyboard 46 for entering text data and user commands, and pointing device 47. Pointing device 47 preferably comprises a mouse for pointing, selecting and manipulating objects displayed on display screen 42.

Computing equipment 40 includes a computer-readable memory medium such as computer fixed disk 45 and/or floppy disk drive 44 and/or CD-ROM drive 49. Floppy disk drive 44 and CD-ROM drive 49 provide means whereby computing equipment 40 can access information, such as image data, computer-executable process steps, application programs, device drivers, etc. stored on removable memory media.

Printer 50 is representative of a color output device whose gamut and spectral measurements and reflectances are measured in order to apply regression analysis to obtain a single best fit color value in output device coordinates for the plural different target color values in viewing condition dependent space corresponding to multiple different viewing conditions. Such a printer forms color images on a recording medium such as paper or transparencies or the like. The invention may be practiced with other color output devices (such as a film recorder). In addition, digital color scanner 80 is provided for scanning documents and images into computing equipment 40. Of course, computing equipment 40 may acquire document and image data from other sources such as a digital camera or a digital video camera or from a local area network or the Internet via network interface bus 90.

Spectral reflectances as a function of light wavelength are provided to computing equipment 40, such as by using a spectrofluorimeter to measure reflectance of color patches over a wavelength, a spectrophotometer, or any other method that measures or has access to spectral reflectances. Application programs contained within fixed disk 45, which will be described in more detail with regard to FIGS. 2 through 13, use the data to perform the functions of the invention.

Figure 2:
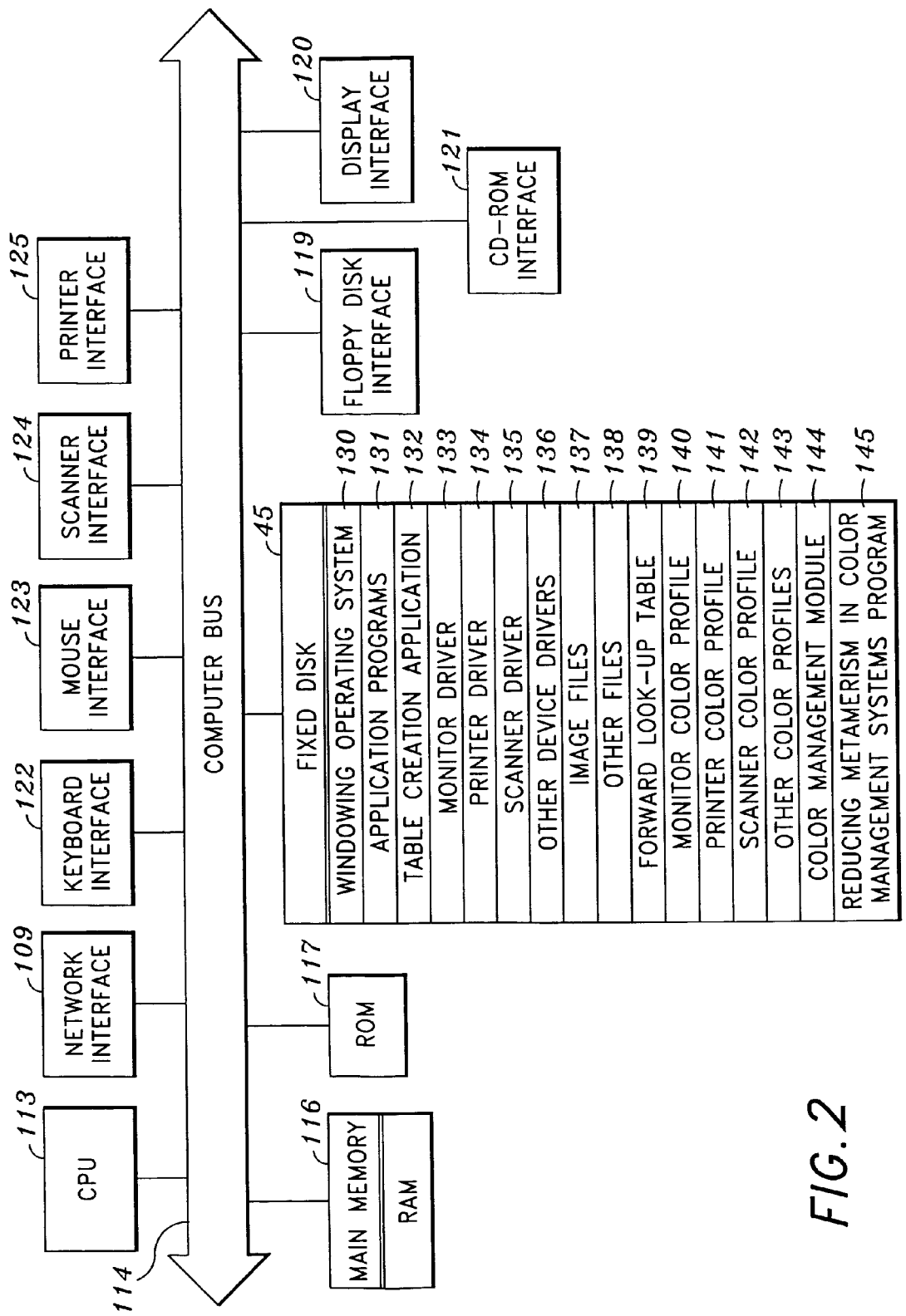
FIG. 2 is a detailed block diagram showing the internal architecture of the computer equipment shown in the computer system of FIG. 1.

FIG. 2 is a detailed block diagram showing the internal architecture of host processor 41 of computing equipment 40. As shown in FIG. 2, host processor 41 includes central processing unit (CPU) 113 that interfaces with computer bus 114. Also interfacing with computer bus 114 are fixed disk 45, random access memory (RAM) 116 for use as main memory, read only memory (ROM) 117, floppy disk interface 119, CD-ROM interface 121, display interface 120 to monitor 43, network interface 109, keyboard interface 122 to keyboard 46, mouse interface 123 to pointing device 47, scanner interface 124 to scanner 80, and printer interface 125 to printer 50.

Main memory 116 interfaces with computer bus 114 so as to provide RAM storage to CPU 113 during execution of software programs such as an operating system, application programs and device drivers. More specifically, CPU 113 loads computer-executable process steps from fixed disk 45 into a region of main memory 116. CPU 113 then executes the stored process steps from main memory 116 in order to execute software programs such as an operating system, application programs and device drivers. Data such as color images can be stored in main memory 116, where the data can be accessed by CPU 113 during the execution of computer-executable process steps that use or alter the data.

As also shown in FIG. 2, fixed disk 45 contains operating system 130, which is preferably a windowing operating system although other operating systems may be used, application programs 131, such as table creation application 132, image processing applications, color appearance modeling applications that both include a color management module, and plural device drivers, including a monitor driver 133, printer driver 134, scanner driver 135, and other device drivers 136. Fixed disk 45 also includes image files 137, other files 138, forward look-up table 139, monitor color profile 140 for monitor 43, printer color profile 141 for printer 50, scanner color profile 142 for scanner 80, and other color profiles 143 for other devices and peripherals (not shown). The present invention is preferably performed by computer-executable process steps which are stored on fixed disk 45 for execution by CPU 113, either as an integrated part of a device driver, such as printer driver 134, or as one of application programs 131 for performing image processing. In this regard, fixed disk 45 further includes color management module (CMM) 144 which is a program comprised of computer-executable process steps for implementing the present invention, for reducing metamerism in color management systems 145.

Reducing metamerism in color management systems according to the present invention will now be described in more detail with regard to FIGS. 3 to 13. Although the following description is applied in the context of a color printer, it should be understood that the present invention is not limited in its application to printers, but may be applied equally for other color output devices whose images are affected by metamerism, such as film recorders.

Figure 3:
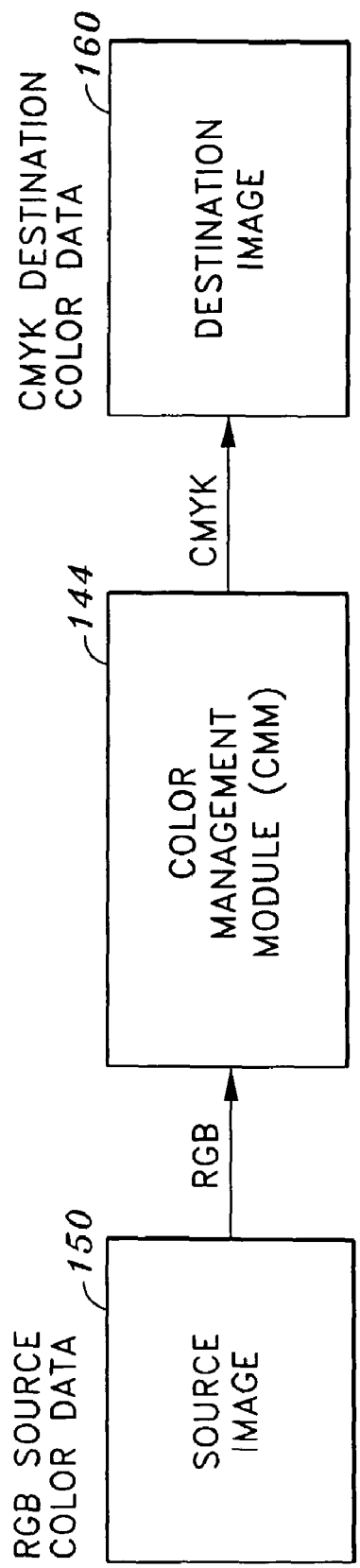
FIG. 3 is a view for providing a general, system level explanation of a color management system according to the present invention.

FIG. 3 is a general system level view for explaining the application of a color management system to RGB source color data according to the present invention. As seen in FIG. 3, the color management system is implemented in color management module (CMM) 144. CMM 144 is applied, for example, to RGB source color data in source image 150 in order to generate CMYK destination color data in destination image 160.

In general, CMM 144, using the spectral measurements of the source device, converts each individual RGB color value in the source image 150 to an XYZ tristimulus value. A forward appearance model is applied to the XYZ tristimulus value for viewing conditions at the source so as to convert the XYZ tristimulus values into a perceptual color space, such as JCh. Gamut adjustments are made in the JCh perceptual color space. Multiple different inverse appearance transforms are applied to a color value in perceptual color space, one each for different viewing conditions, thereby resulting in plural different target color values in a viewing condition dependent space, one each in correspondence to the different viewing conditions. Regression analysis is applied to obtain a single best fit color value in output device coordinates for the plural different target color values in viewing condition dependent space, modeling the device's color behavior using a spectral model. The present invention therefore reduces the effects of metamerism even when a destination image is viewed under multiple different viewing conditions such as different illuminants or surround.

Figure 4A:
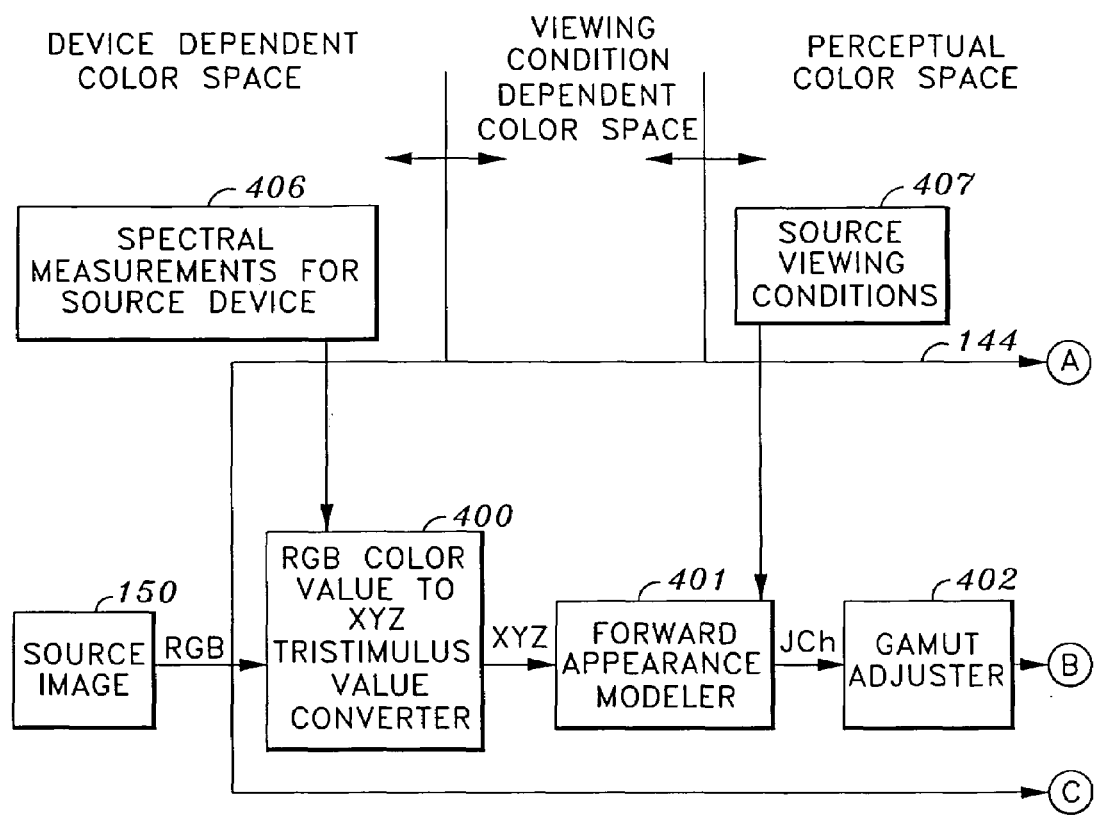
FIGS. 4A–4C are views for providing a detailed system level explanation of reducing metamerism in color management systems according to the embodiment of the present invention.
Figure 4:
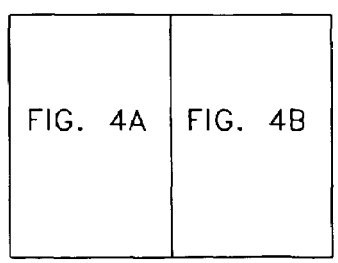
Figure 4B:
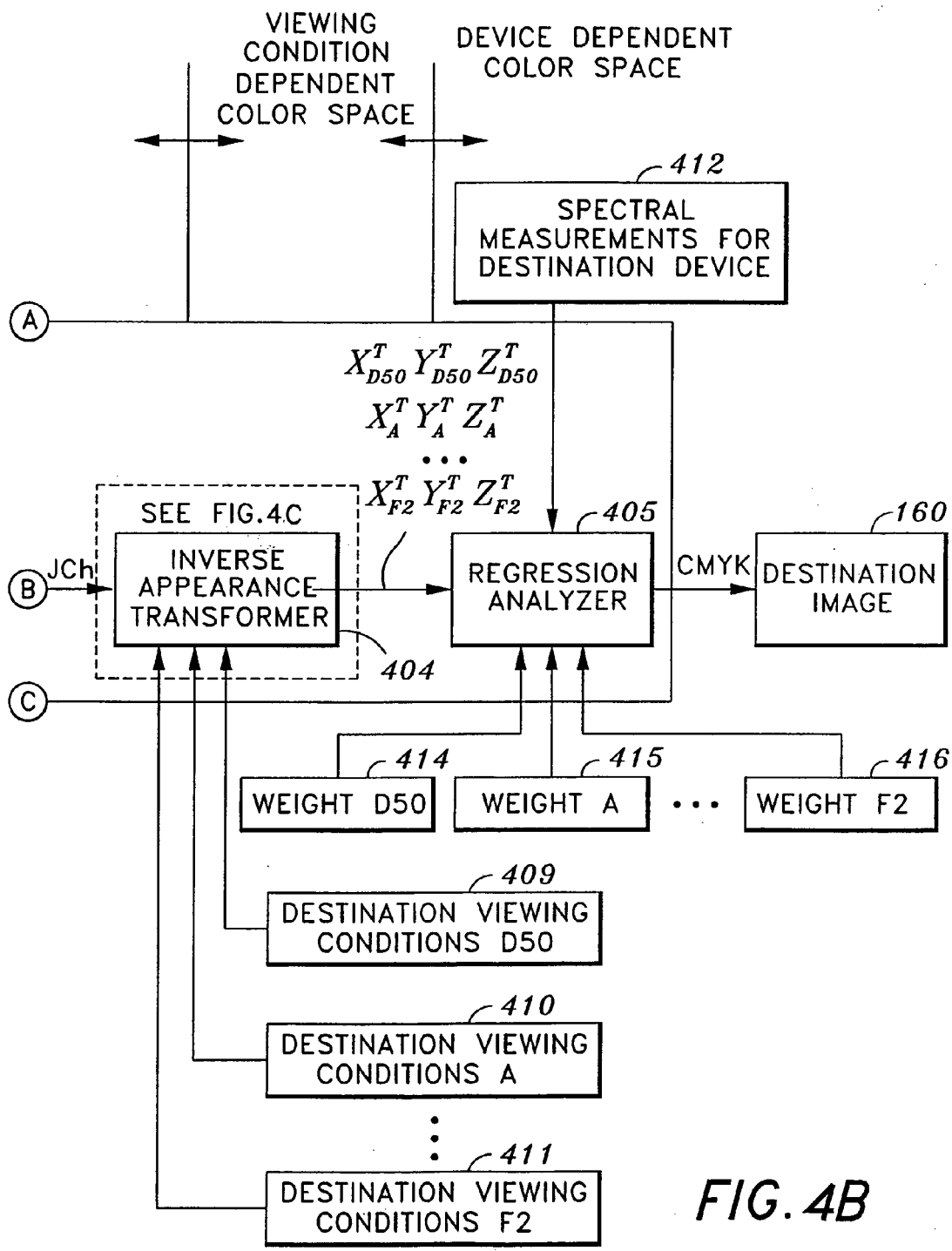
Figure 4C:
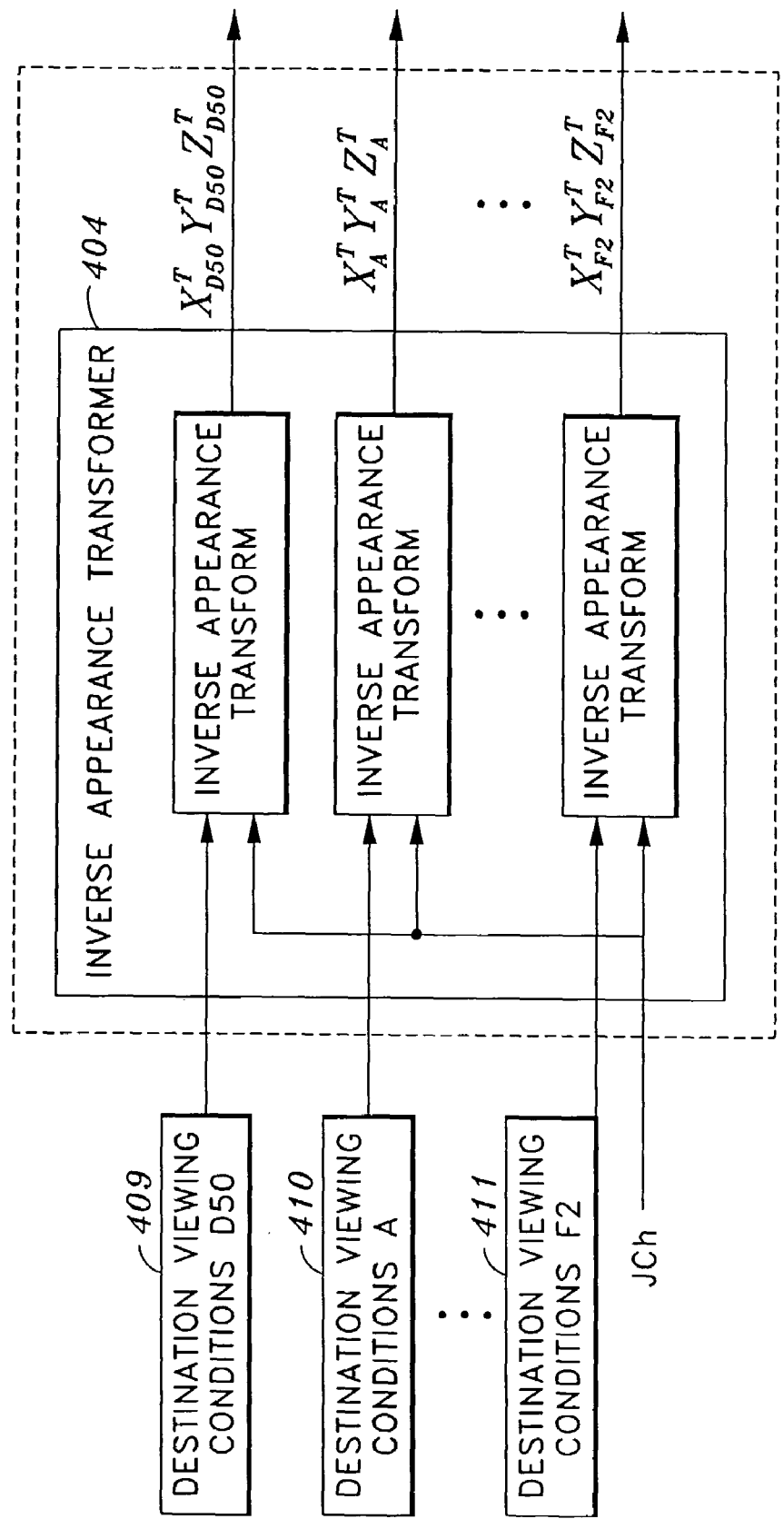

FIGS. 4A through 4C provide a detailed system level explanation of a transformation sequence performed by a color management module according to the present invention. As can be seen in FIGS. 4A and 4B, RGB color data from source image 150 is input to a color management module 144 for generating CMYK color data in destination image 160. Color management module 144 transforms RGB color data, at source image 150, from a color space corresponding to a source device, such as scanner 80, into CMYK color data, at destination image 160, corresponding to a destination device, such as printer 50, reducing the affects of metamerism when the destination image 160 is viewed under multiple different viewing conditions. It can therefore be appreciated that the present invention is advantageous in color transformation sequences where it is desired that the destination image appear the same when viewed under multiple different viewing conditions.

As also depicted in FIGS. 4A and 4B, color management module 144 utilizes two sets of spectral measurements to perform the transformation sequence; spectral measurements for source device 406 and spectral measurements for destination device 412.

Turning to the transformation sequence of FIGS. 4A and 4B, color management module 144 accesses RGB source color data from source image 160 for processing in order to generate CMYK destination color data for destination image 150. A transformation 400 is made on each RGB color value in the source image 150 of the source device into viewing condition dependent XYZ tristimulus values using the spectral measurements for source device 406.

Continuing in the transformation process of FIG. 4A, a forward appearance model 401 is applied for source viewing conditions 407 so as to convert the XYZ tristimulus values into a JCh value in JCh color space or other perceptual color space. This cylindrical coordinate space can be used to describe the appearance of a color independent of its viewing environment, and is therefore an appropriate space to use when gamut mapping colors.

Once in JCh perceptual color space, in the transformation process, gamut adjustments 402 are performed to adjust the image so that non-reproducible colors can be reproduced with good fidelity. Frequently the reproduction colorant and medium cannot produce the same range of colors that the original colorant and medium can produce. The gamut boundary depends on the appearance of colors in the source image in device dependent color space and will change with changes in illumination. If no accurate measurement of the ambient lighting exists the gamut boundary can be computed, depicted in FIG. 12, by predicting XYZ values for sampled colors on the gamut boundary. To do this, probabilistic estimates of the most likely lighting environments are made in Step 1201. These estimates, along with measurements of the spectral reflectances of colorants on a given medium 1210 and the response functions of the CIE Standard Observer 1211, are used to estimate likely XYZ values for a given color patch (Step 1202). In step 1204, the XYZ values are converted to perceptual color space coordinates (such as JCh or Lab). This is analogous to the way a gamut boundary description is computed using a known light source, but works with the probabilistic estimates of a light source instead.

Returning to FIG. 4C, inverse appearance transformations 404 map from perceptual color space to target XYZ values. By changing the viewing condition parameters between the forward and inverse models, original XYZ values can be mapped into perceptual color space values and then perceptual color space values are mapped into reproduction target XYZ values. Therefore a reproduction can be produced that yields the same appearance as the original image even though viewed in multiple different viewing conditions. Any combination of colorants that yields the desired target XYZ value on the reproduction will yield the desired appearance. Because of metamerism, it is expected that there be several such combinations. For each of the target viewing conditions n, depicted as 409, 410 and 411, the inverse appearance model is used to calculate the desired $X_n^T Y_n^T Z_n^T$ values, the superscript "T" representing "target", in the viewing condition, so as to preserve appearance. For example, if a set of target viewing conditions are Illuminant A, Illuminant D50, and Illuminant F2, then $X_A^T Y_A^T Z_A^T$, $X_{D50}^T Y_{D50}^T Z_{D50}^T$, and $X_{F2}^T Y_{F2}^T Z_{F2}^T$ would be calculated. (In practice, the CIE standard illuminants might not be used exactly but measurements of "typical" light bulbs and "typical" daylighting). Multiple different inverse appearance transforms are applied to a color value in perceptual color space (such as Lab or JCh space), one each for different viewing conditions, thereby resulting in plural different target color values in a viewing condition independent color space (such as XYZ space), one each in correspondence to the different viewing conditions.

Once the inverse appearance transformations for multiple viewing conditions 404 have been applied, the CMM 144 transformation process performs a regression analysis 405 to obtain a single, best fit, color value in output device coordinates for the multiple different viewing conditions and the plural different target color values in viewing condition dependent space, modeling the device's color behavior using a spectral model.

To perform this, $E_n(\lambda)$ is used to indicate the illumination at a given wavelength λ from a known illuminant (or source) n. For example, the spectral power distribution from CIE Illuminant A, a tungsten bulb, would be indicated as $E_A(\lambda)$. $S(\lambda)$ is used to indicate the surface reflectance at a given wavelength, and $\bar{x}(\lambda), \bar{y}(\lambda), \bar{z}(\lambda)$ to indicate the CIE color matching functions at that wavelength. The tristimulus values for surface colors under source n are computed as follows:

$$X = \int \bar{x}(\lambda) E_n(\lambda) S(\lambda) d\lambda$$

$$Y = \int \bar{y}(\lambda) E_n(\lambda) S(\lambda) d\lambda$$

$$Z = \int \bar{z}(\lambda) E_n(\lambda) S(\lambda) d\lambda$$

Because $S(\lambda)$ is a function of the colorants used to make the color patch, for a given set of colorants $S(\lambda)$ will always be the same. $S(\lambda)$ can then be replaced with a function of the device colorants. If, for example, there are four colorants: C,M,Y, and K, then $S(\lambda)$ is replaced with $F(C,M,Y,K,\lambda)$. The function F may be determined in several different technology-dependent ways. For some devices, it could be determined by brute force. If the device cannot produce many colors, it is possible to simply measure each color. For many classes of devices, analytical models have been found to be effective in characterizing the device. For example, the Kubelka Monk model works well with dye sublimination printers and the Neugebaur model, or variations of it, works well with offset presses. The present invention is applicable for any function F.

The example creates the following nine equations:

$$X_A = \int \bar{x}(\lambda) E_A(\lambda) F(C, M, Y, K, \lambda) d\lambda$$

$$Y_A = \int \bar{y}(\lambda) E_A(\lambda) F(C, M, Y, K, \lambda) d\lambda$$

$$Z_A = \int \bar{z}(\lambda) E_A(\lambda) F(C, M, Y, K, \lambda) d\lambda$$

$$X_{D50} = \int \bar{x}(\lambda) E_{D50}(\lambda) F(C, M, Y, K, \lambda) d\lambda$$

$$Y_{D50} = \int \bar{y}(\lambda) E_{D50}(\lambda) F(C, M, Y, K, \lambda) d\lambda$$

$$Z_{D50} = \int \bar{z}(\lambda) E_{D50}(\lambda) F(C, M, Y, K, \lambda) d\lambda$$

$$X_{F2} = \int \bar{x}(\lambda) E_{F2}(\lambda) F(C, M, Y, K, \lambda) d\lambda$$

$$Y_{F2} = \int \bar{y}(\lambda) E_{F2}(\lambda) F(C, M, Y, K, \lambda) d\lambda$$

$$Z_{F2} = \int \bar{z}(\lambda) E_{F2}(\lambda) F(C, M, Y, K, \lambda) d\lambda$$

Now, a least squared method, among other methods, will find a single CMYK color value that produces a good fit to all the target XYZ values (ie, $X_A^T Y_A^T Z_A^T$, $X_{D50}^T Y_{D50}^T Z_{D50}^T$, $X_{F2}^T Y_{F2}^T Z_{F2}^T$, etc.) under all the viewing conditions (ie, lighting environments). The objective here is to minimize the errors between $X_A Y_A Z_A$ and $X_A^T Y_A^T Z_A^T$, and between $X_{D50} Y_{D50} Z_{D50}$ and $X_{D50}^T Y_{D50}^T Z_{D50}^T$, and between $X_{F2} Y_{F2} Z_{F2}$ and $X_{F2}^T Y_{F2}^T Z_{F2}^T$, for some color difference metric such as $\Delta E$, so as to obtain a single CMYK color value for which the errors from an exact match meet acceptable error conditions. Although least squared error is presently preferred, other error conditions can also be employed, such as "absolute value sums" or error bounding. A least squared fit will not necessarily produce the optimal results for any one lighting environment, but it will produce an acceptable result with reduced metamerism across the set of viewing conditions.

The set of equations will be undetermined if there are fewer equations than there are variables to be fit. If the number of equations and unknowns match, then there is at most one solution to the equations. If there are more equations than unknowns, then the solution is overdetermined so that there is no exact answer to the set of equations. However an exact answer is not being sought, only a best fit. So as long as there are more equations than unknown variables, the number of colorants can be increased (e.g., a five- or a seven-color system). More equations can be generated by adding more viewing conditions to be matched. However, in general, the more conditions to be matched, the less good the match will be under any one viewing condition.

As stated above, to obtain the single color value in device coordinates that best fits the plural different target color values in viewing condition dependent space, the device's color behavior is modeled using a spectral model. The spectral model gives spectral reflectance of colors in device space as a function of wavelength. For example, a set of patches is printed by printer 50 using the target medium and colorants. Each of these patches is then measured spectrally so as to build the function F(C,M,Y,K,$\lambda$).

In one implementation, the patches are measured with a spectrofluorimeter. A higher degree of accuracy can be obtained in measurements by using a spectrofluorimeter, as opposed to other methods such as a spectrophotometer, to measure the spectral reflectances from the color patches because of its ability to measure the entire function S($\lambda$) as well as take into account fluorescence. Flourescent materials, such as commercial paper with whitening agents and some commercial inks, emit or reflect some incident energy at longer wavelengths. The columns in FIG. 5, reproduced from Seth Ansell's paper, *Measurement of Fluorescence in Inkjet and Laser Printing*, demonstrate how incident energy at one wavelength may be reflected at longer wavelengths. It is possible for it to be reflected at shorter wavelengths, but this does not happen with the media being considered. The total spectral radiance factor (TSRF) values for a sample can be computed by multiplying the matrix values by the spectral power distribution of a light source and then summing the products over wavelength. Now F(C,M,Y,K,$\lambda$) in the first equation in the previous example can be implemented as:

$$TSRF_A(\lambda) = \sum_{300}^{780} matrixCMYK_{i,\lambda}$$

where matrixCMYK is the bi-spectral radiance factor matrix for a given color patch composed of a given combination of C, M, Y, and K ink at wavelength $\lambda$. Although it is a more complicated formula then would be used with a spectrophotometer, the same least squared error fit is performed on the target XYZ tristimulus values to find the best match. Moreover, the match will be more accurate then if fluorescence had not been taken into account.

Note that the above analysis gave equal weight, and hence importance, to each viewing condition. To assist in determining a best fit, the importance of different ones of the viewing conditions can be weighted 414, 415, 416, as demonstrated in FIGS. 4B and 5, so as to represent more accurately the probability that any one viewing condition occurs more than others. If one source is either more probable than the others or more important, then weighting may be added to the regression analysis in 405, such that the errors for the most important sources matter more than errors for less important sources. This produces a system that can be used to match each color yielding a reasonable match under the most important sources and reducing metamerism as much as possible for other less important sources.

Figure 6B:
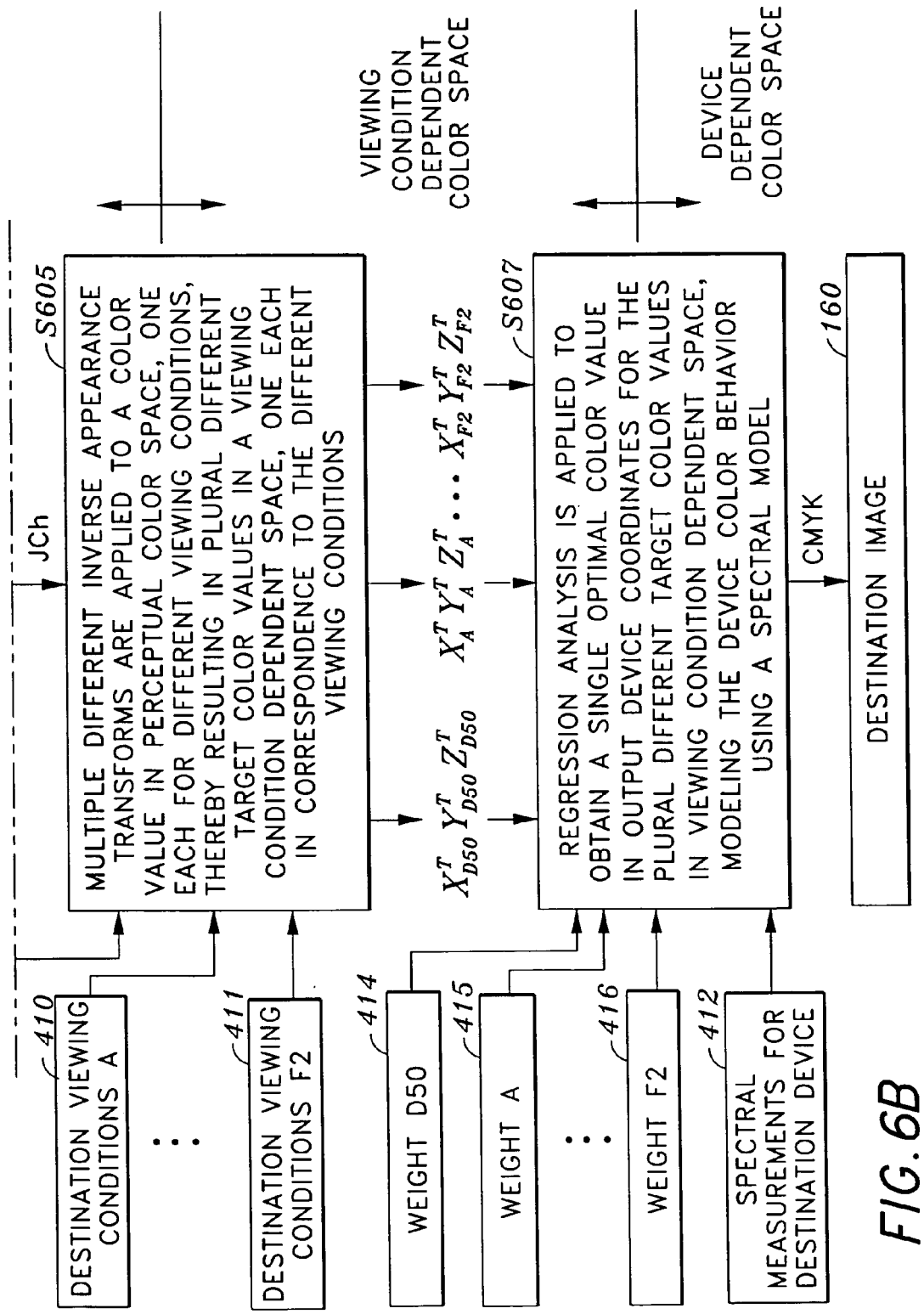

FIGS. 6A and 6B provide a flowchart depicting and explaining the process of reducing metamerism in color management systems according to the present embodiment. In step S601, RGB source color data is accessed for the color management according to the present invention. Each individual RGB color value in the source image 150 is converted into an XYZ tristimulus value utilizing the spectral measurements for the source device. Next, a forward appearance model is applied for viewing conditions at the source so as to convert the XYZ tristimulus values into a perceptual color space in step S602. Gamut adjustments are then performed in perceptual color space using probabilistic estimates of an illuminant to adjust the image so that all colors can be reproduced. (step S604). Multiple different inverse appearance transforms are applied to a color value in perceptual color space, one each for different viewing conditions and associated weight values, thereby resulting in plural different target color values in viewing condition dependent space, one each in correspondence to the different viewing conditions (step S605). Regression analysis is applied in step S607 to obtain a single best fit color value in output device coordinates for the plural different target color values in viewing condition dependent space, modeling the device's color behavior using a spectral model.

The above embodiment was described as if regression analysis were performed for every pixel in the image to be processed. Many color systems will benefit from pre-calculation of the results of regression analysis, and storage of the results in a format such as an ICC device profile from which it can be used more readily and with less computational effort. More particularly, color imaging systems are designed not to produce large jumps in appearance for small changes in device colorant levels. Therefore, for most devices, if perceptual color space or device space is uniformly sampled, device values between the samples will tend to have an appearance in between their neighbors. A device profile includes instructions for converting color values from a perceptual color space (such as Lab or XYZ space) into color values in a device dependent color space (such as CMYK), in which such conversions implement regression analysis of plural different target color values corresponding to multiple different viewing conditions. A color lookup table can be created to transfer from perceptual color space to device colorant space in such a way as to reduce metamerism.

Figure 7:
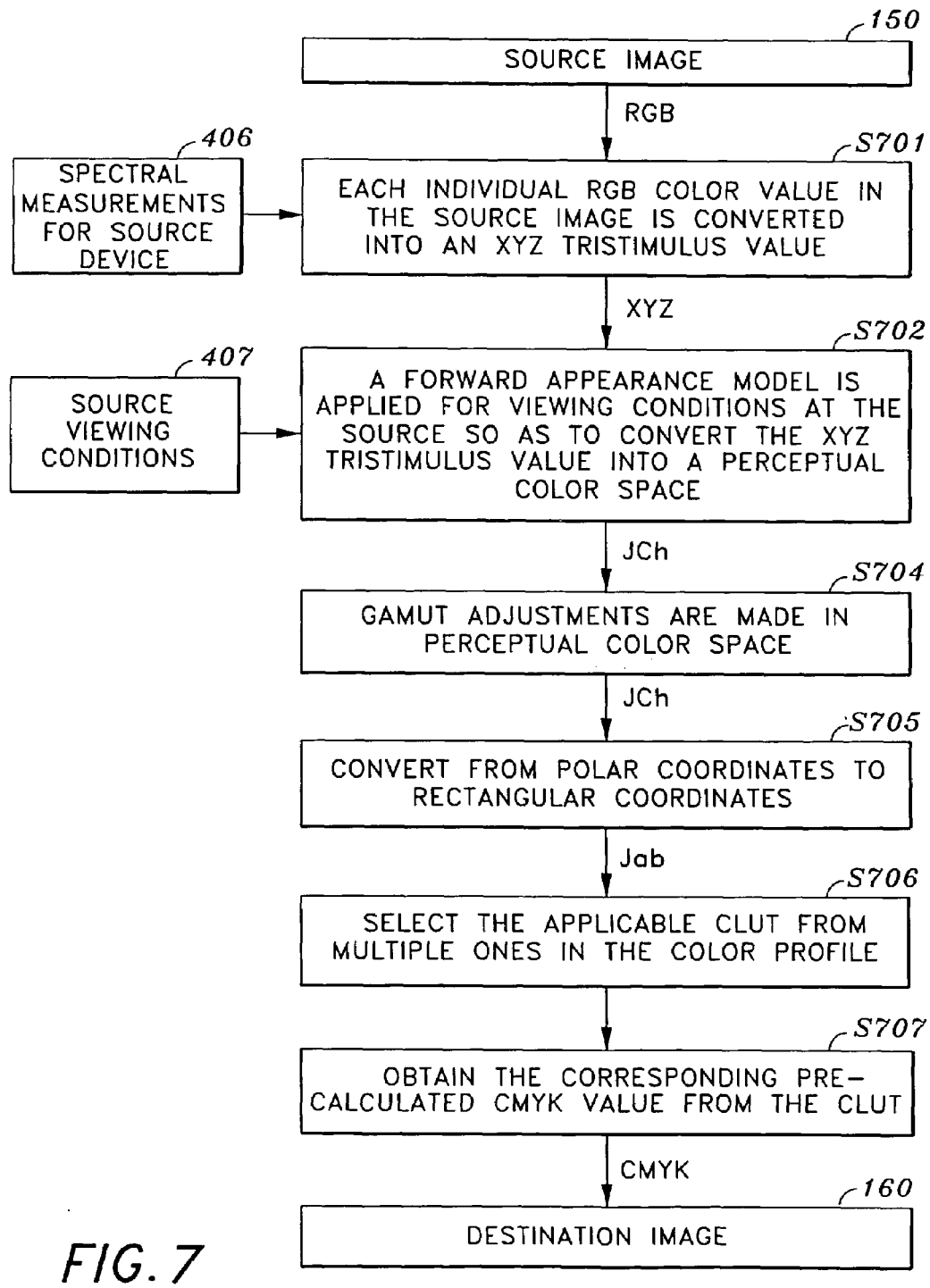
FIG. 7 is a flow diagram depicting a color management module using a pre-built color lookup table.

Preferably, the lookup table provides an output CMYK value for an input XYZ tristimulus value, since such a table would conform to the convention utilized by the International Color Consortium. (Of course, other input/output arrangements for the lookup table are possible, such as an output CMYK value directly from an input JCh value.) FIG. 7 demonstrates obtaining an output CMYK value for an input XYZ tristimulus value using the pre-calculated CLUTs for the different viewing conditions. Steps S701 through S704 correspond directly to steps S601 through S604 in FIG. 6. Once gamut adjustments are made in perceptual color space, step S705 converts from polar coordinates to rectangular coordinates. Then the applicable CLUT is selected in step S706 from multiple ones in the color profile, each for a different combination of viewing conditions. This CLUT is used in step S707 to obtain the corresponding pre-calculated CMYK value, associated with the XYZ values converted to in step S705, to be used in destination image 160. The CMYK value is the single best fit color value in output device coordinates for the plural different target color values in viewing condition dependent space.

Figure 8:
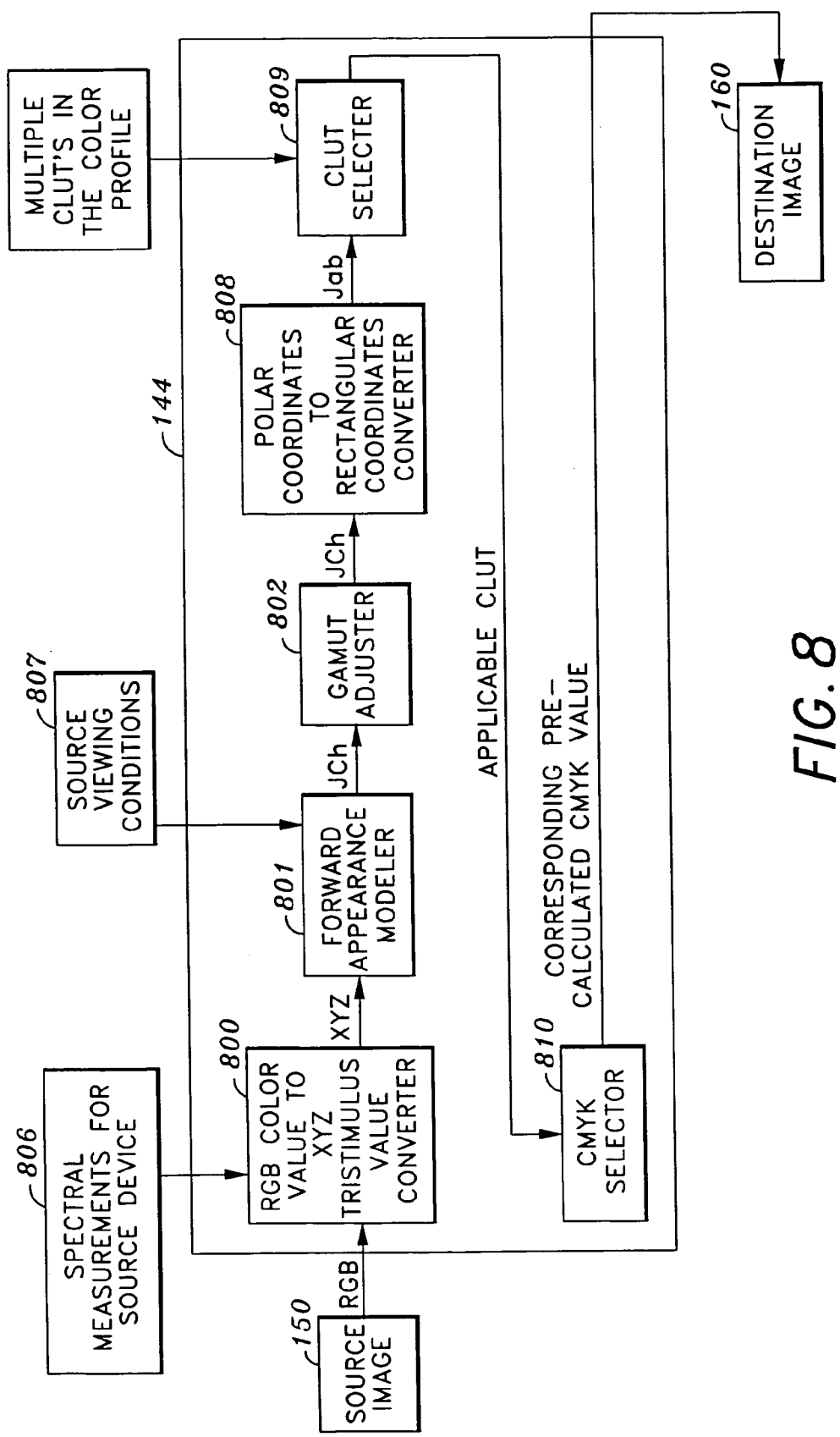
FIG. 8 is view for providing a detailed system level explanation of a color management module using a pre-built color lookup table.

FIG. 8 provides a detailed system level explanation of a color management module using a pre-built color lookup table. References 800 through 807 correspond directly to the same items in FIG. 4A. Once gamut adjustments 802 are made in perceptual color space, polar coordinates are converted to rectangular coordinates 808. The CLUT Selecter 809 obtains the applicable CLUT from the multiple CLUT's in the color profile, each for a different combination of viewing conditions. Once the CLUT has been selected the CMYK Selector 810 obtains the corresponding pre-calculated CMYK value that is used in the destination image 160.

Figure 9:
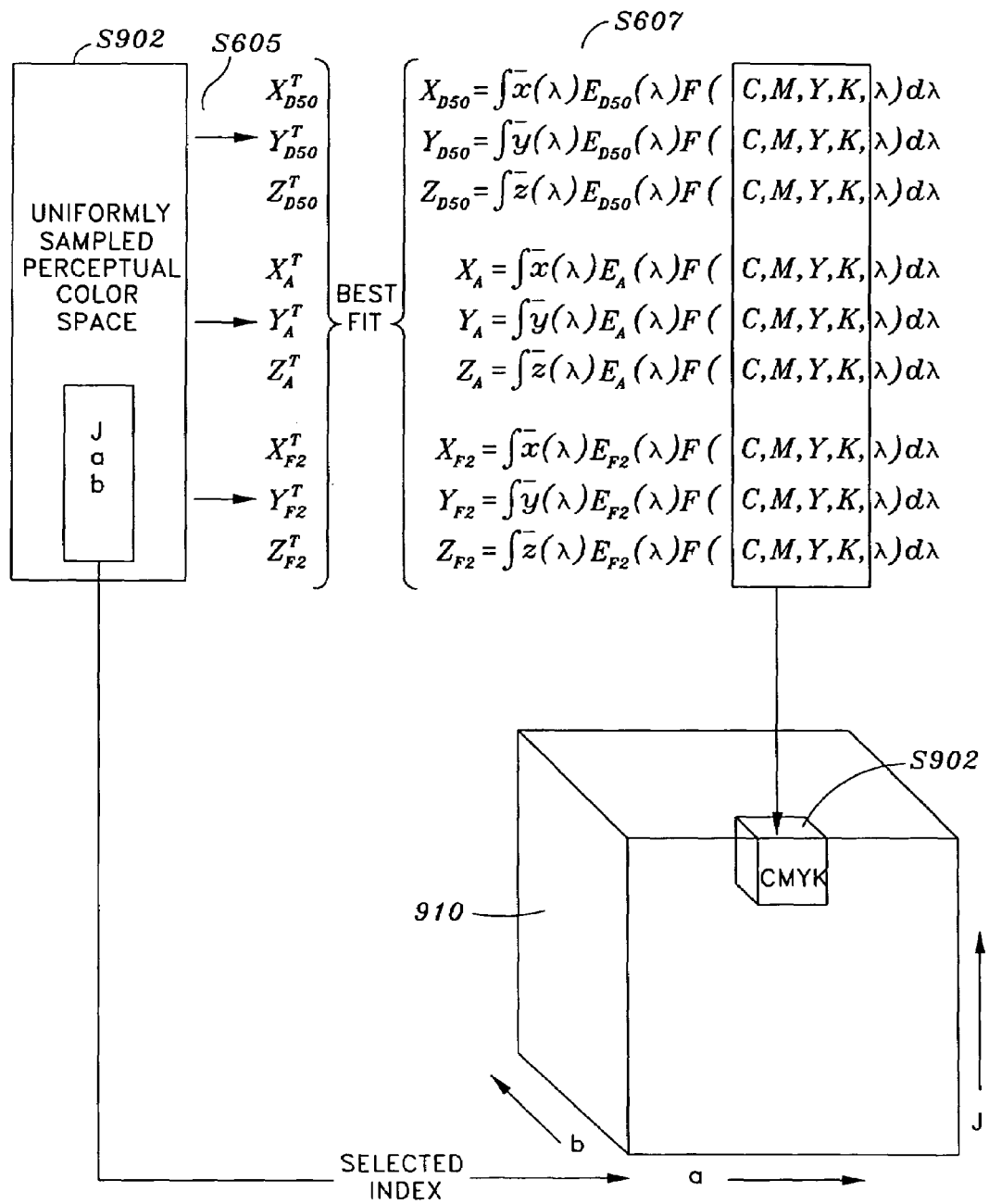
FIG. 9 is view for explaining the creation of a color lookup table to convert from perceptual color space to device dependent color space in such a way as to reduce metamerism in color management systems according to one embodiment of the present invention.

FIG. 9 demonstrates the creation of the Jab index into such a lookup table using the viewing conditions in the previous example. In step S901, perceptual color space is preferably uniformly sampled and those values converted to XYZ target tristimulus values under the viewing condition used in the regression analysis (ie, FIG. 6 step S605). The Jab value of the uniformly sampled perceptual color space is chosen as the index into the lookup table. For all XYZ triplets, regression analysis is applied to obtain a single best fit color value in output device coordinates for the plural different target color values in viewing condition dependent space, modeling the device's color behavior using a spectral model (ie, FIG. 6 step S607). These colorants are now stored in the lookup table at the Jab coordinates of the uniformly sampled perceptual color space, populating the table with CMYK outputs (step S902). This creates the color lookup table 910; that is, a color conversion containing a mapping from perceptual color space (like Jab or XYZ) to device dependent space (such as CMYK space).

The problems solved by pre-calculation and storage of the results of regression analysis (e.g., the results can be used more readily and with less computational effort) exist in characterizing an input device for typical consumer use. These exist because consumers lack the appropriate measuring equipment, expertise, and desire to accurately characterize their viewing environments. The appearance of an image to be scanned cannot be accurately predicted if we do not have an accurate measurement of the lighting environment. However, as in gamut adjustments, and depicted in FIG. 13, a probabilistic estimate of the most likely viewing conditions can be made in step S1301. Those estimates can be used along with measurements of the spectral reflectance of colorants on a given medium 1310 and the response functions of the CIE Standard Observer 1311 to estimate likely XYZ values for a given color patch (step S1302). This XYZ value can be used to create an input lookup table in step S1305, from input device values to tristimulus values, or from perceptual color space coordinates if the XYZ values are converted to perceptual color space coordinates in step S1304.

In the regression analysis for an output device, because metamerism implies that many different CMYK combinations will produce any one color appearance, the probability of a good fit CMYK color value for plural different target XYZ tristimulus values is high.

The CMYK color value obtained by such regression analysis is then used to reproduce the corresponding color from the source image 150 in the destination image 160. Because the destination device color is obtained through a best-fit regression analysis of plural different target color values corresponding to multiple different viewing conditions, metameric shifts in the color's appearance due to changes in viewing condition are significantly reduced as compared to color management systems which obtain colors accurate only for a single viewing condition.

To assist in proper selection of such weights, and according to a further aspect of the invention, a graphical user interface is provided by which suitable weights may be selected for selectable viewing conditions.

Figure 10:
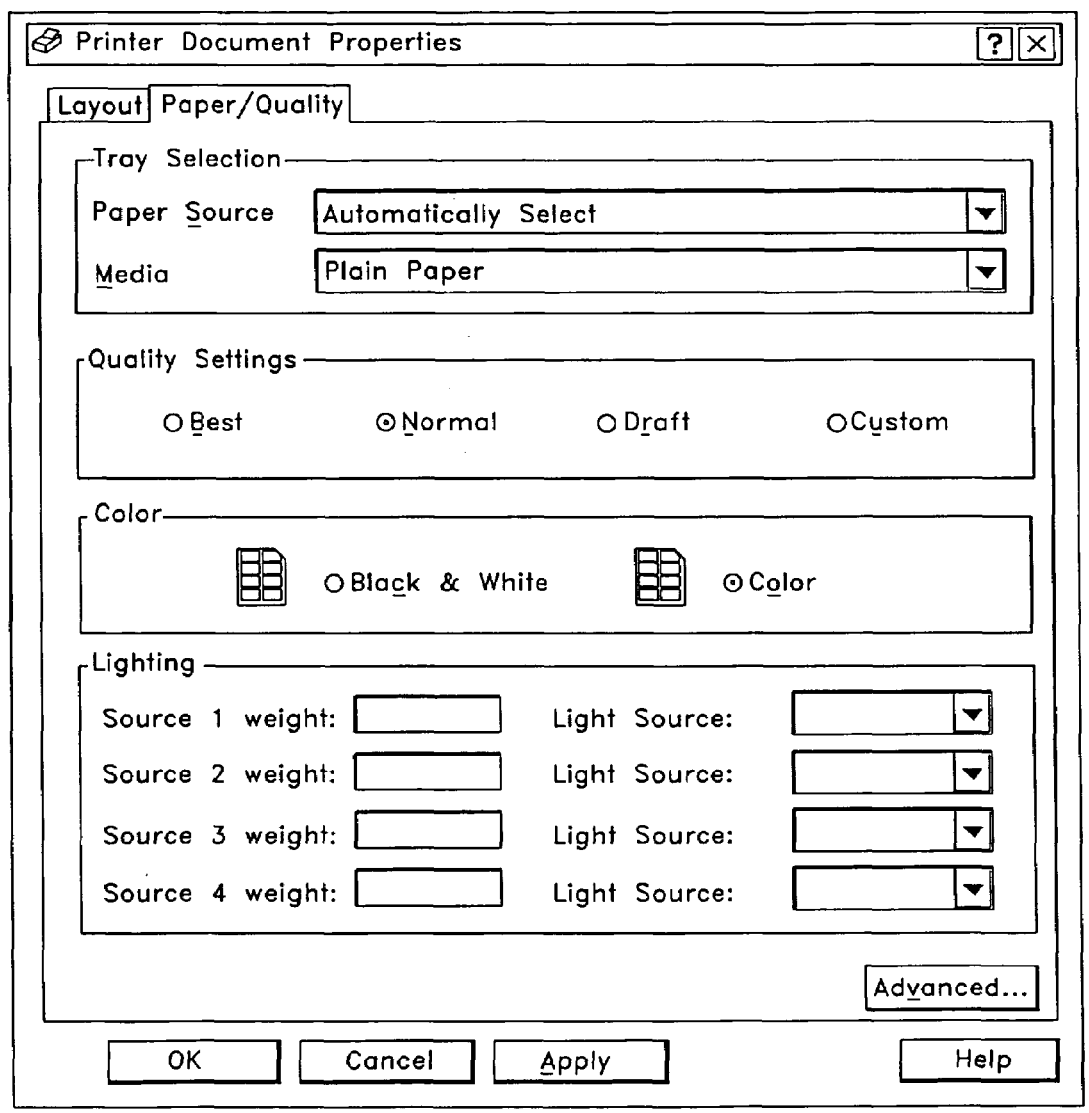
FIG. 10 is a GUI for an ICC profile builder where users define weights for light sources, which would be values between 0.0 and 1.0, and specify the light source with a pull down menu where the menu would be loaded with the CIE standard illuminants. The GUI would also have an option to select custom measured light sources.

FIG. 10 represents a GUI which can be used in an ICC profile builder to populate CLUTs, or in a printer driver to allow an end user to select viewing conditions and probabilistic weights for implementing regression analysis or selecting a pre-built CLUT. Although for the sake of simplicity, the total number of light sources is set at four, the present invention contemplates more or less than four viewing conditions, as well as non-illuminant viewing conditions such as surround. The initial value in the first column of edit boxes would be 0.0, indicating that none of the sources are used. Users define weights for the sources, which are values between 0.0 and 1.0. Then they specify the light source with a pull down menu. The menu is loaded with the CIE standard illuminants. It also has an option to select a custom measured light source. This is done using a standard file selection box. There is a supported file format for storing custom profiles, for example, one floating point number per line, each number indicating a relative spectral power at a corresponding wavelength. The application designer specifies the first wavelength and bandwidth, or a more flexible format could be supported.

Figure 11:
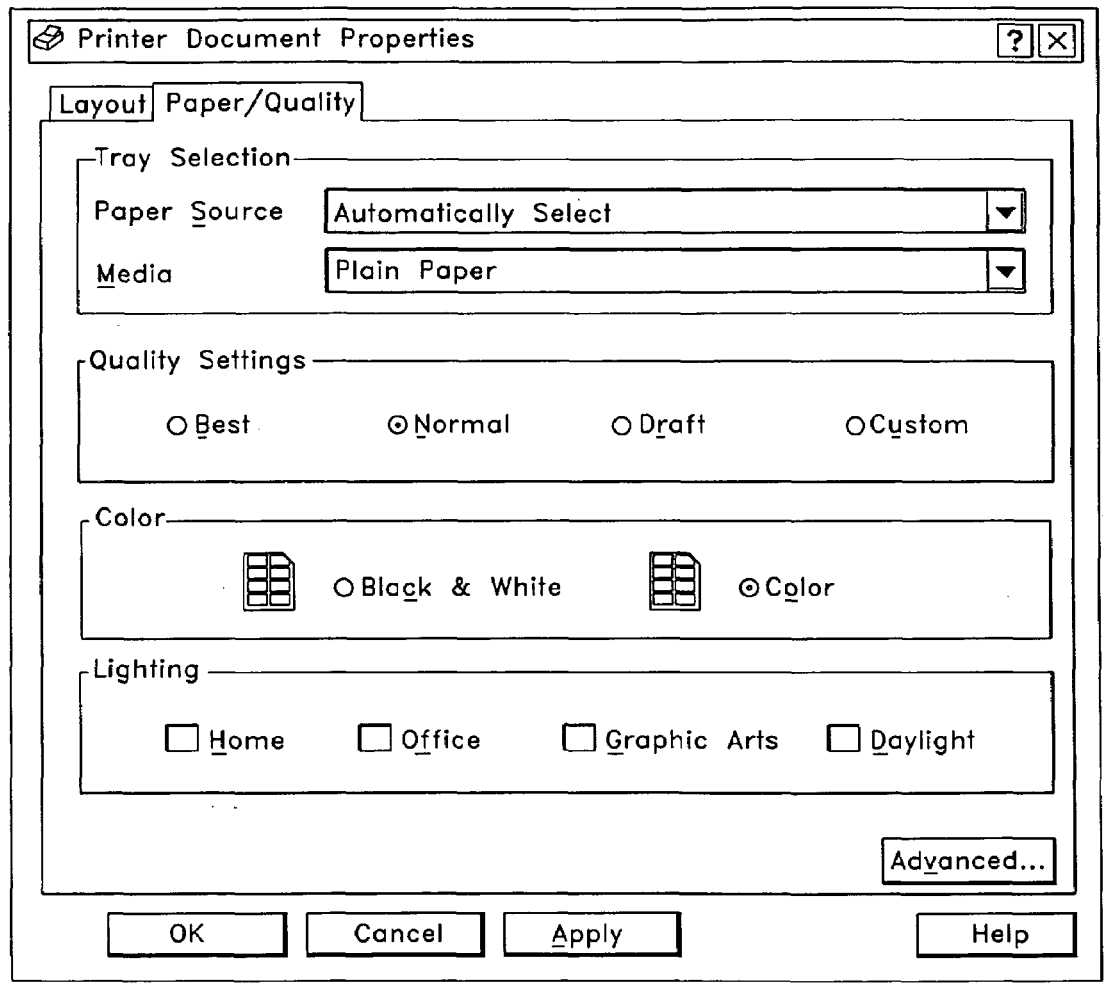
FIG. 11 is a GUI for an ICC profile builder where users indicate what types of lighting they expected to encounter.
Figure 12:
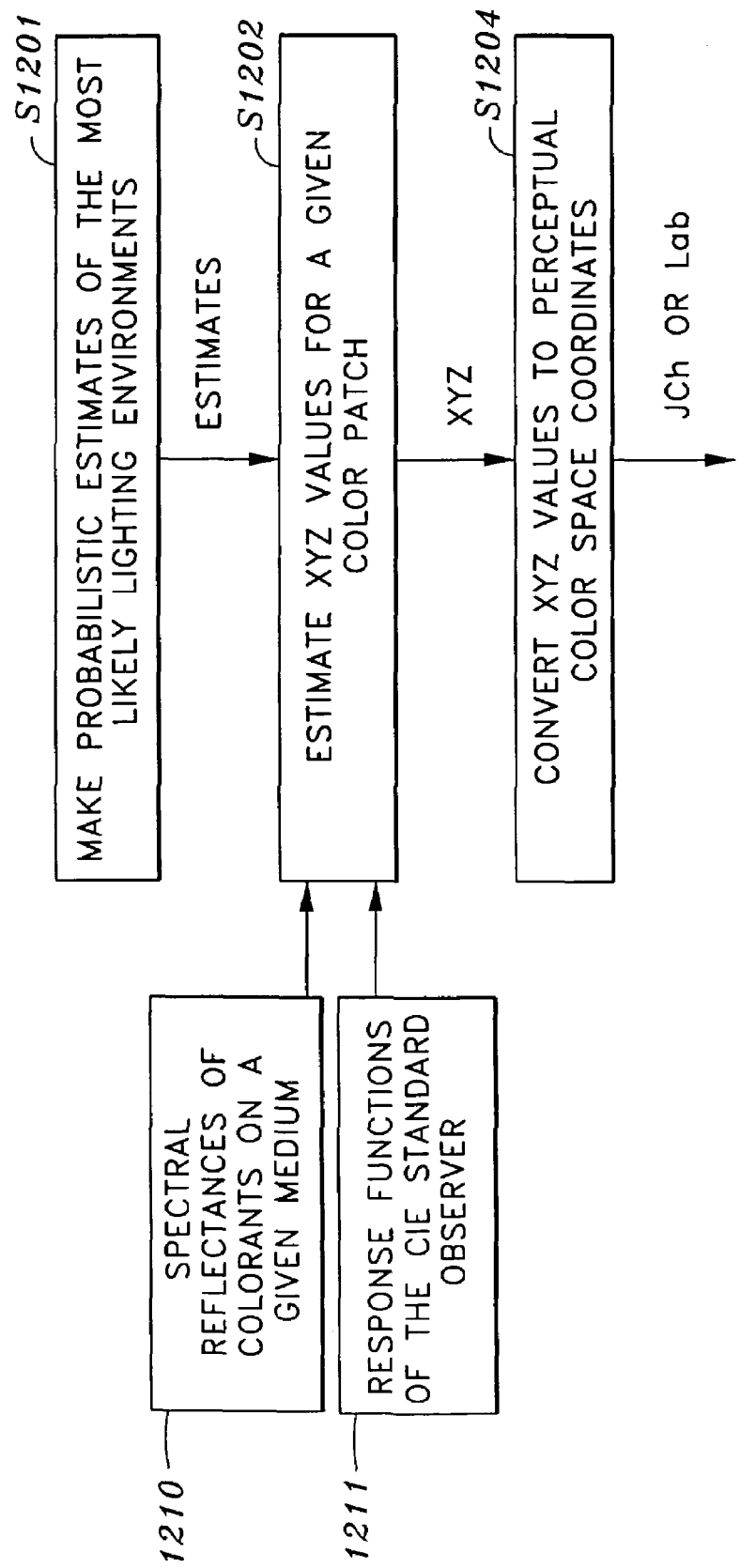
FIG. 12 is a flowchart depicting the process of estimating what the XYZ values for a given color patch are likely to be if no accurate characterization of the viewing conditions exists in such a way as to perform gamut adjustments.
Figure 13:
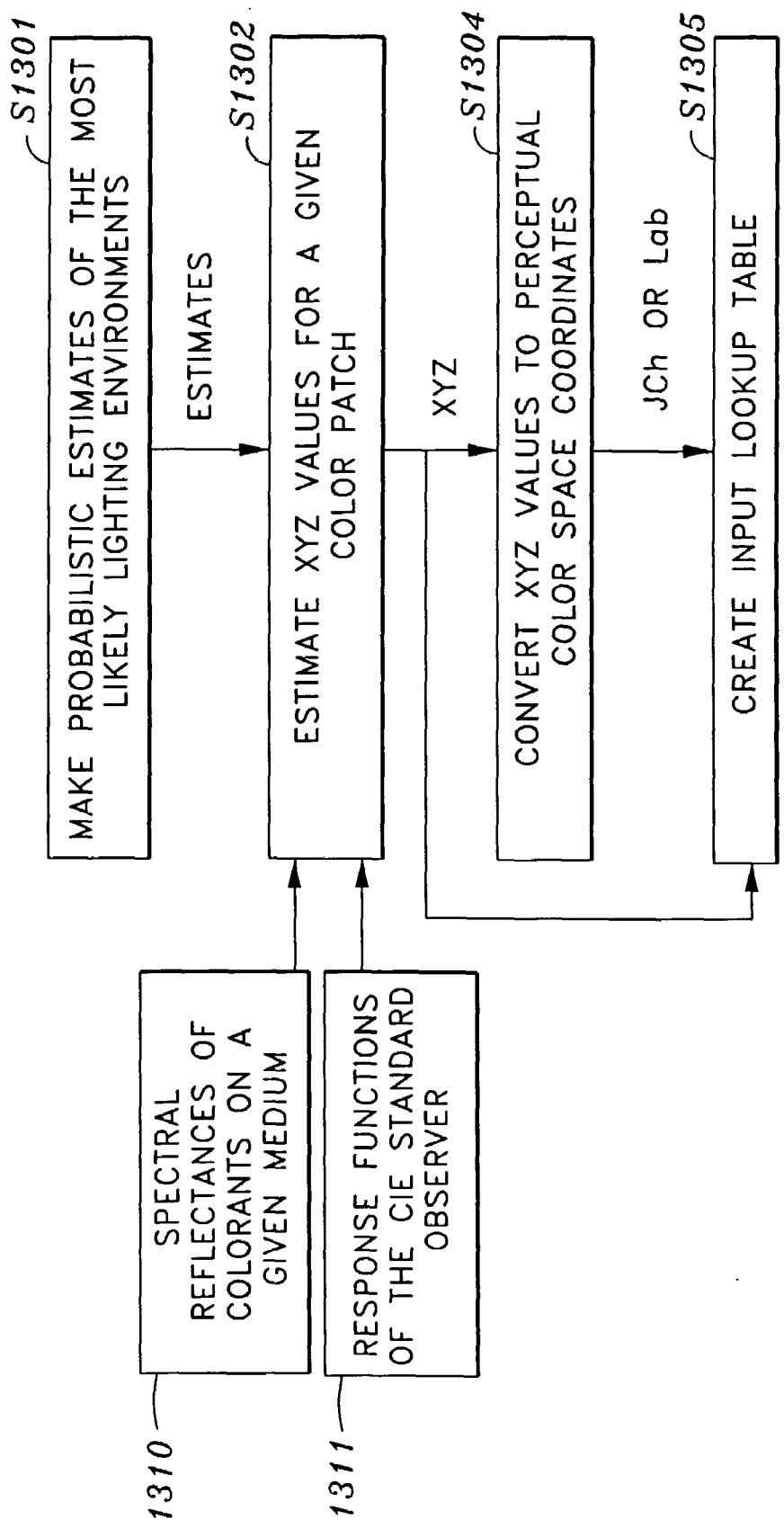
FIG. 13 is a flowchart depicting the process of estimating what the XYZ values for a given color patch are likely to be if no accurate characterization of the viewing conditions exists in such a way as to create an input lookup table from input device values to tristimulus values or perceptual color space coordinates.
Figure 14B:
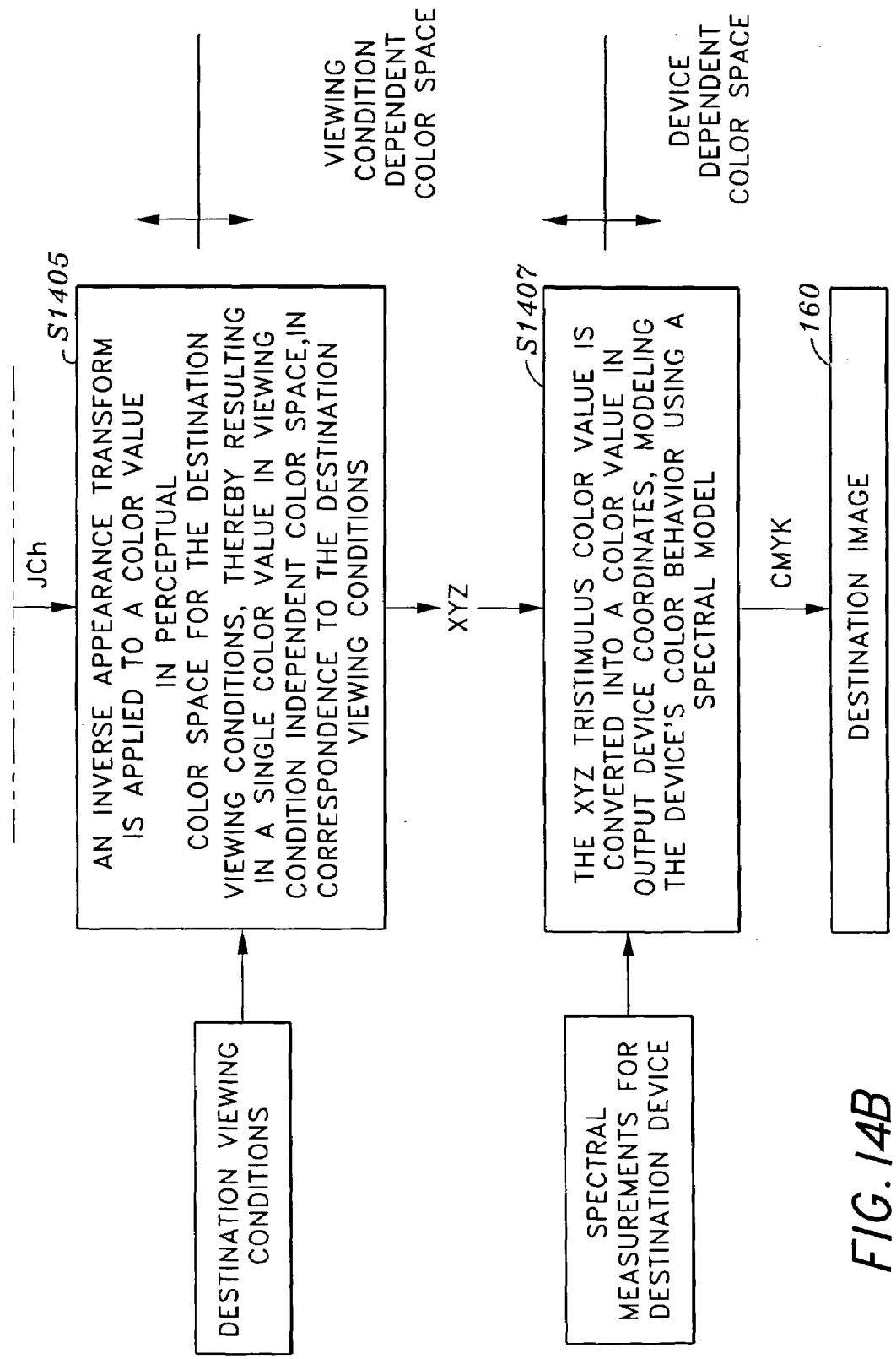

FIG. 11 represents another GUI which can be used in an ICC profile builder to populate CLUTs, or in a printer driver to allow an end user to select viewing conditions and probabilistic weights for implementing regression analysis or selecting a pre-built CLUT. This alternative allows users to indicate what types of lighting they expect to encounter. This is accomplished with a checkbox based interface. In such an interface, the programmer determines the weights to associate with each illuminant (or other viewing condition such as surround). This could give an equal weight to each, but it would not have to. For example, since the D50 source is important to graphic arts, it might put 75 percent of the weight on that source if it is present. The remaining weight would be divided evenly between the other sources.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A method for converting a color value of a color in a perceptual color space, comprising the steps of:
    applying multiple inverse transforms to the color value, each transform for transforming the color value from a perceptual color space to a viewing condition dependent color space, each different inverse transform corresponding to a different viewing condition, thereby resulting in plural different target color values for the color in respective ones of multiple different viewing conditions in a viewing condition dependent space; and
    calculating a single color value in device dependent color space that fits the plural target color values with acceptable error.

2. A method according to claim 1, wherein the step of calculating a color value in device dependent color space comprises the step of applying regression analysis to the plural different target color values using a spectral model that measures spectral reflectance of colors in the device dependent color space.

3. A method according to claim 2, wherein the regression analysis is comprised of a least squared fit.

4. A method according to claim 2, wherein the regression analysis is a weighted regression analysis in which the multiple different viewing conditions are weighted.

5. A method according to claim 4, further comprising the step of entering weight values into a user interface.

6. A method according to claim 2, wherein the spectral model also models fluorescence.

7. A method according to claim 1, wherein the multiple different viewing conditions comprise different viewing illuminants.

8. A method according to claim 1, wherein the multiple different viewing conditions include multiple different surrounds.

9. A method according to claim 1, further comprising gamut-mapping in the perceptual color space.

10. A method according to claim 1, further comprising the step of storing the device dependent values in a look-up table accessible as a function of the color values in perceptual color space.

11. A method according to claim 9, further comprising the step of estimating likely XYZ values for a given color patch based on probabilistic estimates of the most likely viewing conditions, measurements of the spectral reflectance of colorants on a given medium and the response functions of the CIE Standard Observer so as to perform gamut mapping.

12. A method according to claim 10, estimating likely XYZ values for a given color patch based on probabilistic estimates of the most likely viewing conditions, measurements of the spectral reflectance of colorants on a given medium and the response functions of the CIE Standard Observer so as to create an input lookup table from input device values to tristimulus values or perceptual color space coordinates.

13. An apparatus for converting color coordinates of a color in a perceptual color space, comprising:
    a program memory for storing process steps executable to
    (a) apply multiple inverse transforms to a color value, each transform for transforming the color value from a perceptual color space to a viewing condition dependent color space, each different inverse transform corresponding to a different viewing condition, thereby resulting in plural different target color values for the color in respective ones of multiple different viewing conditions in a viewing condition dependent space, and
    (b) calculate a single color value in device dependent color space that fits the plural target color values with acceptable error; and
    a processor for executing the process steps stored in said program memory.

14. Computer-executable process steps stored on a computer readable medium, said computer-executable process steps for converting color coordinates of a color in a perceptual color space, said computer-executable process steps comprising process steps executable to perform a method according to any of claims 1 to 12.

15. A computer-readable medium which stores computer-executable process steps, the computer-executable process steps for converting color coordinates of a color in a perceptual color space, said computer-executable process steps comprising process steps executable to perform a method according to any of claims 1 to 12.

16. A color management system for converting from a source image in source device dependent coordinates to a destination image in destination device dependent coordinates comprising:
    a first transformation sequence for transforming the source image in source device dependent coordinates into a perceptual color space; and
    a second transformation sequence for transforming from the perceptual color space into the destination device dependent coordinates;
    wherein the second transformation sequence includes a transformation from the perceptual color space into a viewing condition dependent space with plural such conversions being applied using respective ones of multiple different viewing conditions, and regression analysis on the plural results so as to obtain a color in device coordinates that best fits the plural results.

17. A color management system according to claim 16, wherein the regression analysis is comprised of a least squared fit.

18. A color management system according to claim 16, wherein the multiple different viewing conditions comprise different viewing illuminants.

19. A color management system according to claim 16, wherein the multiple different viewing conditions include different surrounds.

20. A color management system according to claim 16, wherein the regression analysis is a weighted regression analysis in which the multiple different viewing conditions are weighted.

21. A color management system according to claim 20, further comprising a user interface into which a user can enter weight values.

22. A color management system according to claim 20, wherein a spectral model also models fluorescence.

23. A color management system according to claim 16, further a storage device for storing the device dependent coordinates in a look-up table accessible as a function of the color values in perceptual color space.

24. An apparatus for converting color coordinates of a color in a perceptual color space, comprising:

program memory means for applying multiple inverse transforms to the color value, each transform for transforming the color value from a perceptual color space to a viewing condition dependent color space, each different inverse transform corresponding to a different viewing condition, thereby resulting in plural different target color values for the color in respective ones of multiple different viewing conditions in a viewing condition dependent space; and calculating means for calculating a single color value in device dependent color space that fits the plural target color values with acceptable error.

* * * * *